(12) United States Patent
Wang

(10) Patent No.: US 12,061,444 B2
(45) Date of Patent: Aug. 13, 2024

(54) WATCH ASSEMBLY METHOD AND WEARABLE DEVICE

(71) Applicant: BEIJING XIAOMI MOBILE SOFTWARE CO., LTD., Beijing (CN)

(72) Inventor: Xuefeng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1 day.

(21) Appl. No.: 18/072,529

(22) Filed: Nov. 30, 2022

(65) Prior Publication Data

US 2024/0053709 A1 Feb. 15, 2024

(30) Foreign Application Priority Data

Aug. 11, 2022 (CN) .......................... 202210964318.6

(51) Int. Cl.
| | |
|---|---|
| *B30B 15/06* | (2006.01) |
| *C09J 5/06* | (2006.01) |
| *G04B 37/11* | (2006.01) |
| *G04B 37/22* | (2006.01) |

(52) U.S. Cl.
CPC ............ *G04B 37/22* (2013.01); *B30B 15/065* (2013.01); *C09J 5/06* (2013.01); *G04B 37/11* (2013.01)

(58) Field of Classification Search
CPC .................................................. B29C 65/4845
See application file for complete search history.

(56) References Cited

U.S. PATENT DOCUMENTS

2020/0164598 A1* 5/2020 Schmieder ................. C09J 5/06

FOREIGN PATENT DOCUMENTS

| JP | 6-94848 A | 4/1994 | |
| WO | WO-2021125815 A1 * | 6/2021 | ............. G04B 37/08 |

OTHER PUBLICATIONS

Budhe, S., Ghumatkar, A., Birajdar, N. et al. Effect of surface roughness using different adherend materials on the adhesive bond strength. Appl Adhes Sci 3, 20 (2015). https://doi.org/10.1186/s40563-015-0050-4 (Year: 2015).*
Extended European Search Report issued Aug. 24, 2023 in European Application 22210229.5, 7 pages.

* cited by examiner

*Primary Examiner* — Jacob J Cigna
(74) *Attorney, Agent, or Firm* — Oblon, McClelland, Maier & Neustadt, L.L.P.

(57) ABSTRACT

A watch assembly method includes: processing a first bonding surface on a first connecting member, bonding a first laser adhesive layer on the first bonding surface and activating the first laser adhesive layer; processing a second bonding surface on a second connecting member, bonding a second laser adhesive layer on the second bonding surface and activating the second laser adhesive layer; fixing the second connecting member with the first connecting member preliminarily in such a manner that the first laser adhesive layer and the second laser adhesive layer face each other, and pressing the first connecting member and the second connecting member against each other until the first laser adhesive layer and the second laser adhesive layer are completely bonded and infiltrated.

11 Claims, 4 Drawing Sheets

WATCH ASSEMBLY METHOD AND WEARABLE DEVICE

CROSS-REFERENCE TO RELATED APPLICATIONS

This application is based on and claims priority to Chinese Patent Application No. 202210964318.6 filed on Aug. 11, 2022, the entire contents of which are incorporated herein by reference for all purposes.

BACKGROUND OF THE INVENTION

Field of the Invention

In the design of a current smart watch, the requirement for a waterproof performance is relatively high. Generally, the whole watch is required to meet a 5 ATM waterproof performance. In the related art, a middle frame and a back shell of the watch usually adopt a design scheme of a waterproof ring for sealing and waterproof, i.e., an annular mounting groove is formed in the middle frame of the watch, and the waterproof ring is arranged in the mounting groove. Then, the middle frame and the back shell of the watch are closed together, and a pressing screw is also arranged at each of four corners of the back shell of the watch, so as to press the back shell and the middle frame of the watch against each other, thus ensuring an interference fit between the waterproof ring and the shell, and ensuring the waterproof performance of the whole watch.

SUMMARY OF THE INVENTION

The present disclosure relates to a field of electronic devices, and more particularly, to a watch assembly method and a wearable device.

A watch assembly method according to embodiments of a first aspect of the present disclosure includes: processing a first bonding surface on a first connecting member, bonding a first laser adhesive layer on the first bonding surface and activating the first laser adhesive layer; processing a second bonding surface on a second connecting member, bonding a second laser adhesive layer on the second bonding surface and activating the second laser adhesive layer; fixing the second connecting member with the first connecting member preliminarily in such a manner that the first laser adhesive layer and the second laser adhesive layer face each other, and pressing the first connecting member and the second connecting member against each other until the first laser adhesive layer and the second laser adhesive layer are completely bonded and infiltrated.

A wearable device according to embodiments of a second aspect of the present disclosure is processed by a assembly method. The assembly method includes: processing a first bonding surface on a first connecting member, bonding a first laser adhesive layer on the first bonding surface and activating the first laser adhesive layer; processing a second bonding surface on a second connecting member, bonding a second laser adhesive layer on the second bonding surface and activating the second laser adhesive layer; fixing the second connecting member with the first connecting member preliminarily in such a manner that the first laser adhesive layer and the second laser adhesive layer face each other, and pressing the first connecting member and the second connecting member against each other until the first laser adhesive layer and the second laser adhesive layer are completely bonded and infiltrated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
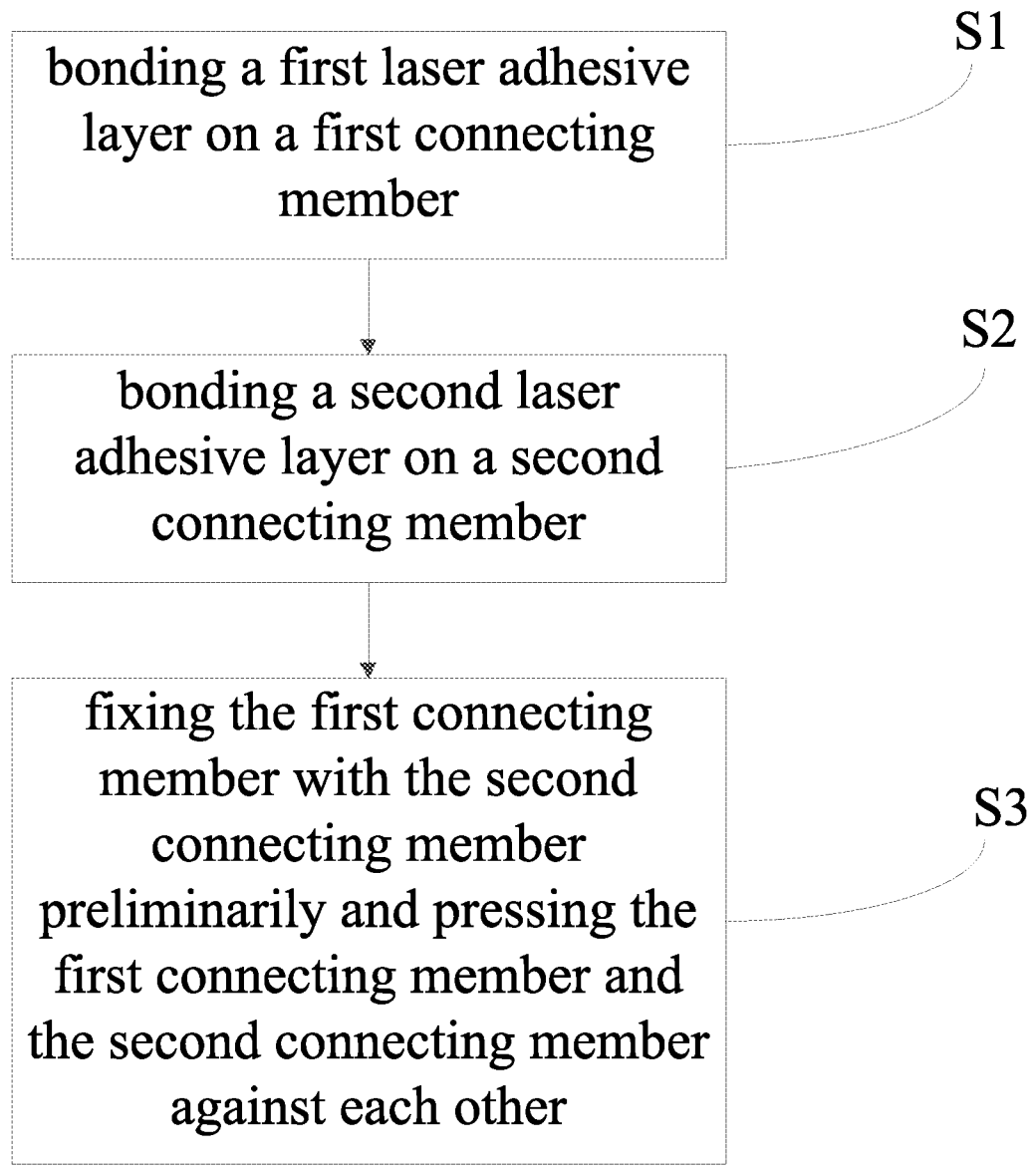
FIG. 1 is a flow chart of a watch assembly method according to an embodiment of the present disclosure.

Referring now to the drawings, wherein like reference numerals designate identical or corresponding parts throughout the several views.

Embodiments of the present disclosure are described in detail below, and examples of the embodiments are shown in accompanying drawings. The following embodiments described with reference to the accompanying drawings are exemplary and are intended to explain the present disclosure rather than limit the present disclosure.

In a waterproof scheme of a watch, a plurality of pressing screws are needed. The screws are exposed to cause poor aesthetics, and threaded holes may affect the waterproof performance. Moreover, the design scheme of a waterproof ring also increases a thickness of the whole watch.

As shown in FIGS. 1 to 10, a watch assembly method according to embodiments of the present disclosure includes following steps.

At step S1, a first bonding surface 13 is processed on a first connecting member 1. The first bonding surface 13 meets requirements of a certain roughness and a certain surface energy. A first laser adhesive layer 4 is bonded on the first bonding surface 13 and activated. The activation manner may be a laser activation or a hot pressing activation.

At step S2, a second bonding surface 22 is processed on a second connecting member 2. The second bonding surface 22 meets requirements of a certain roughness and a certain surface energy. A second laser adhesive layer 5 is bonded on the second bonding surface 22 and activated. The activation manner may be a laser activation or a hot pressing activation.

At step S3, the second connecting member 2 is preliminarily fixed with the first connecting member 1 in such a manner that the first laser adhesive layer 4 and the second laser adhesive layer 5 face each other, and then the first connecting member 1 and the second connecting member 2 are pressed against each other until the first laser adhesive layer 4 and the second laser adhesive layer 5 are completely bonded and infiltrated.

The first laser adhesive layer 4 and the second laser adhesive layer 5 are both formed by a laser adhesive. The laser adhesive is a special elastomer and may be activated by heating and thus play its excellent characteristics, so as to achieve excellent bonding with the object to be bonded. The general activation manners include the laser activation and the hot pressing activation, and both manners activate the laser adhesive by transferring heat to it. However, no matter what manner, the laser adhesive is activated after the two members to be bonded are bonded. If the laser activation is used, the members to be bonded need to have a high transparency, so as to ensure the laser penetration.

In the watch assembly method according to the embodiments of the present disclosure, the first laser adhesive layer 4 and the second laser adhesive layer 5 are arranged on the first connecting member 1 and the second connecting member 2, respectively, and then the first laser adhesive layer 4 and the second laser adhesive layer 5 are activated by heating, so as to soften the laser adhesive layers, thus greatly improving the bonding performance. Further, the first laser adhesive layer 4 and the second laser adhesive layer 5 are bonded and infiltrated together, thus realizing the stable connection between the first connecting member 1 and the second connecting member 2.

The watch assembly method according to the embodiments of the present disclosure has a simple process. A good bonding effect can also be achieved even if the first laser adhesive layer 4 and the second laser adhesive layer 5 are not activated during the pressing process of the first connecting member 1 and the second connecting member 2. There is no restriction on the materials of the members to be bonded. In addition, the bonding manner of the laser adhesive has less restriction on a form of the bonding surface. The laser adhesive may be used to bond planes, and can also play a good bonding and sealing effect for the special-shaped bonding surface.

The watch produced by the watch assembly method according to the embodiments of the present disclosure does not need to have a threaded hole and a pressing screw, so as to prevent the waterproof performance of the whole watch from being influenced by the threaded hole, thus realizing the waterproof performance without screws and improving the aesthetics and integrity of the whole watch. Moreover, a good waterproof effect can be realized and the requirement on the thickness of the laser adhesive is low due to the high viscosity of the laser adhesive layer, thus achieving the waterproof performance of 5 ATM without arranging a waterproof ring, which is conducive to reducing the thickness of the whole watch. Moreover, the laser adhesive is easy to remove, and will not remain on the first connecting member 1 and the second connecting member 2.

It should be noted that the watch assembly method of the present disclosure is not only applied to the assembly of the watch, but also can be applied to other fields, for example a field of electronic devices, such as a mobile phone, a tablet computer, a field of door and window sealing, and a field of vehicles and ships manufacturing.

In some embodiments, each of the first laser adhesive layer 4 and the second laser adhesive layer 5 has a thickness of 0.1 to 0.2 mm. A total thickness of the first laser adhesive layer 4 and the second laser adhesive layer 5 after bonding is less than 0.4 mm, which has little influence on a thickness of the whole watch.

Figure 2:
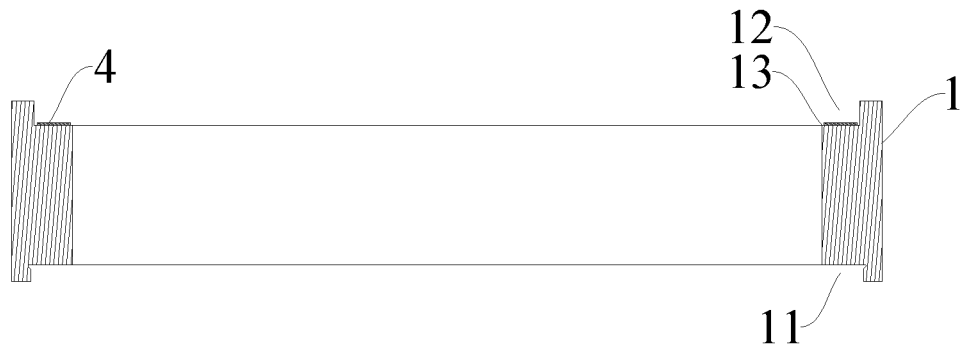
FIG. 2 is a schematic view of a first connecting member and a first laser adhesive layer according to an embodiment of the present disclosure.
Figure 3:
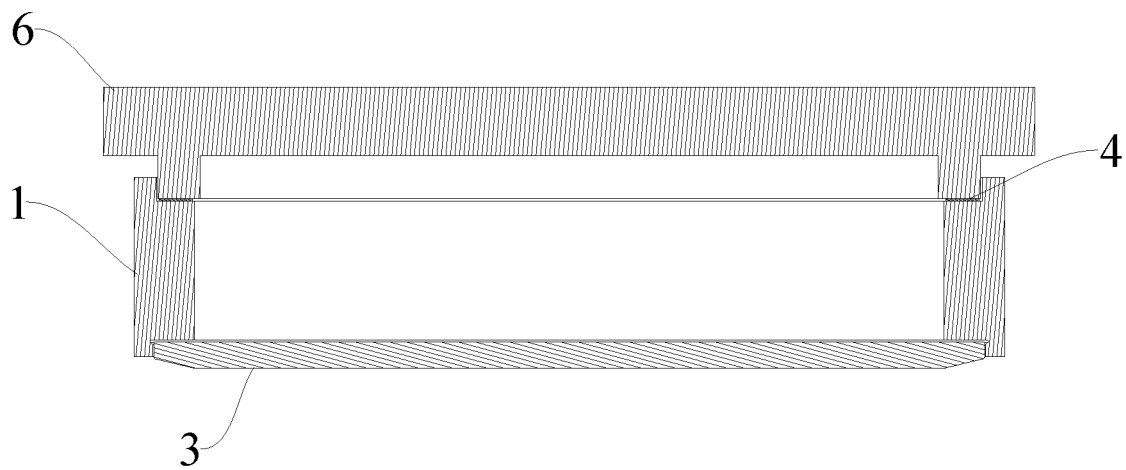
FIG. 3 is a schematic view of a process of heating a first laser adhesive layer by a hot pressing head according to an embodiment of the present disclosure.
Figure 4:
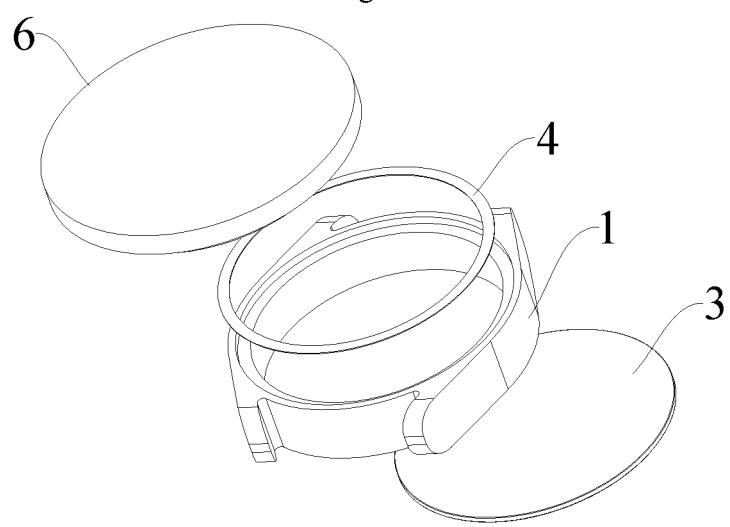
FIG. 4 is an exploded view of a device shown in FIG. 3.
Figure 5:
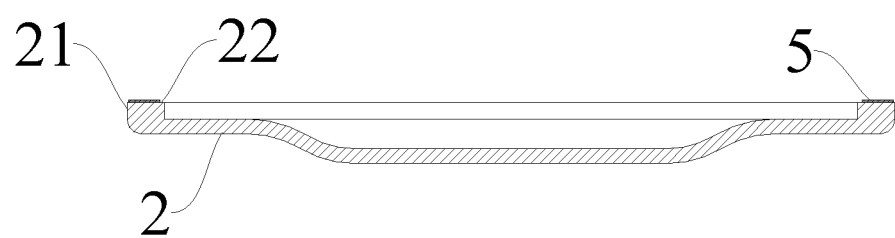
FIG. 5 is a schematic view of a second connecting member and a second laser adhesive layer according to an embodiment of the present disclosure.
Figure 6:
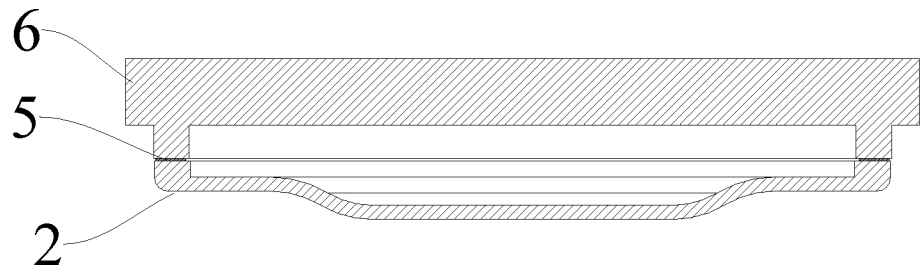
FIG. 6 is a schematic view of a process of heating a second laser adhesive layer by a hot pressing head according to an embodiment of the present disclosure.
Figure 7:
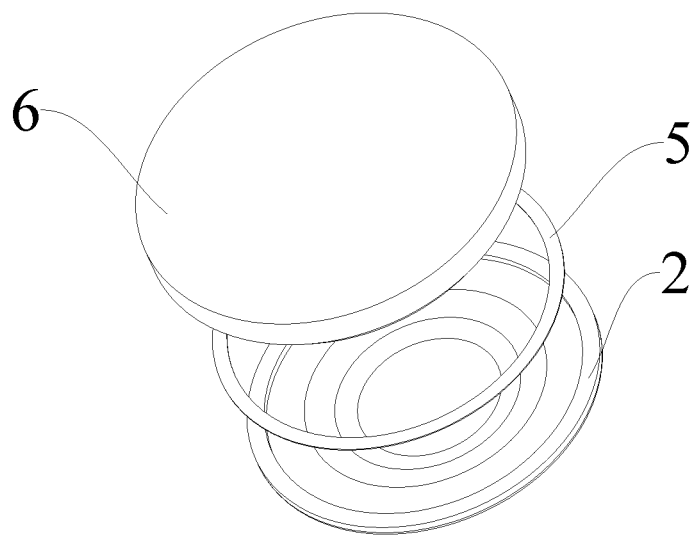
FIG. 7 is an exploded view of a device shown in FIG. 6.

As shown in FIGS. 2 and 5, in some embodiments, the first connecting member 1 is a middle frame, a front end of the middle frame has a first annular mounting groove 11, and a rear end of the middle frame has a second annular mounting groove 12. A screen cover 3 is mounted in the first annular mounting groove 11, and a bottom of the second annular mounting groove 12 is the first bonding surface 13. The second connecting member 2 is a back cover, the back cover has an annular protrusion 21, and an end face of the annular protrusion 21 is the second bonding surface 22. During mounting, the annular protrusion 21 of the back cover is mounted in the second annular mounting groove 12, and the first bonding surface 13 and the second bonding surface 22 are automatically aligned.

In some embodiments, the first bonding surface 13 and the second bonding surface 22 are both processed by a laser engraving process, i.e., the first bonding surface 13 and the second bonding surface 22 are processed by laser cutting, and the surface of the processed workpiece is smooth, so as to meet the requirements on the roughness and the surface energy of the first bonding surface 13 and the second bonding surface 22. When the first bonding surface 13 is processed, the pad printing ink process may also be implemented additionally.

Specifically, a surface energy of the first bonding surface 13 is greater than 34 A, a surface energy of the second bonding surface 22 is greater than 36 A, and a roughness Ra of the first bonding surface 13 and a roughness Ra of the second bonding surface 22 are greater than 0.6 μm. Therefore, the adhesive stability of the first laser adhesive layer 4 on the first connecting member 1 and the adhesive stability of the second laser adhesive layer 5 on the second connecting member 2 can be guaranteed. It should be noted that "34 A" and "36 A" here mean dyne values of dyne pens used in a dyne test for determining a surface energy of a surface, and are used to represent the surface energy of the surface, where 34 A is equal to 34 dyn/cm or mN/m and 36 A is equal to 36 dyn/cm or mN/m. Further, the dyne test is well known in the related art and will not be described here in detail.

The first laser adhesive layer 4 and the second laser adhesive layer 5 may be activated by the laser activation or the hot pressing activation. When the laser activation is used, the first laser adhesive layer 4 and the second laser adhesive layer 5 are directly irradiated by a laser, and the surface of the first connecting member 1 or the second connecting member 2 generates a high temperature instantly and transfers the heat to the laser adhesive, so as to activate the laser adhesive.

When the hot pressing activation is used, a hot pressing head 6 needs to be used to press the first laser adhesive layer 4 on the first connecting member 1 and heat the first laser adhesive layer 4, and the hot pressing head 6 is used to press the second laser adhesive layer 5 on the second connecting member 2 and heat the second laser adhesive layer 5. The hot pressing head 6 is a pressurizing member with a heating function.

As shown in FIGS. 3 to 7, in some embodiments, the first laser adhesive layer 4 and the second laser adhesive layer 5 are heated by the hot pressing head 6. When heating the first laser adhesive layer 4, the hot pressing head 6 presses the first laser adhesive layer 4 against the first connecting member 1 and heats the first laser adhesive layer 4. A pressure applied by the hot pressing head 6 to the first laser adhesive layer 4 is 135 N to 145 N, a pressure application duration is 20 s to 25 s, and a heating temperature of the hot pressing head 6 is 80° C. to 85° C.

Similarly, when heating the second laser adhesive layer 5, the hot pressing head 6 presses the second laser adhesive layer 5 against the second connecting member 2 and heats the second laser adhesive layer 5. A pressure applied by the hot pressing head 6 to the second laser adhesive layer 5 is 135 N to 145 N, a pressure application duration is 20 s to 25 s, and a heating temperature of the hot pressing head 6 is 80° C. to 85° C.

It should be noted that when the hot pressing head 6 is used to heat the first laser adhesive layer 4 and the second laser adhesive layer 5, in order to prevent the laser adhesive layer from being directly bonded to the hot pressing head 6, a first high-temperature resistant release film needs to be arranged between the hot pressing head 6 and the first laser adhesive layer 4, and a second high-temperature resistant release film needs to be arranged between the hot pressing head 6 and the second laser adhesive layer 5. The property of a film body of the high-temperature resistant release film will not change because of being heated during the heating process, so that an isolation function can be achieved.

Figure 8:
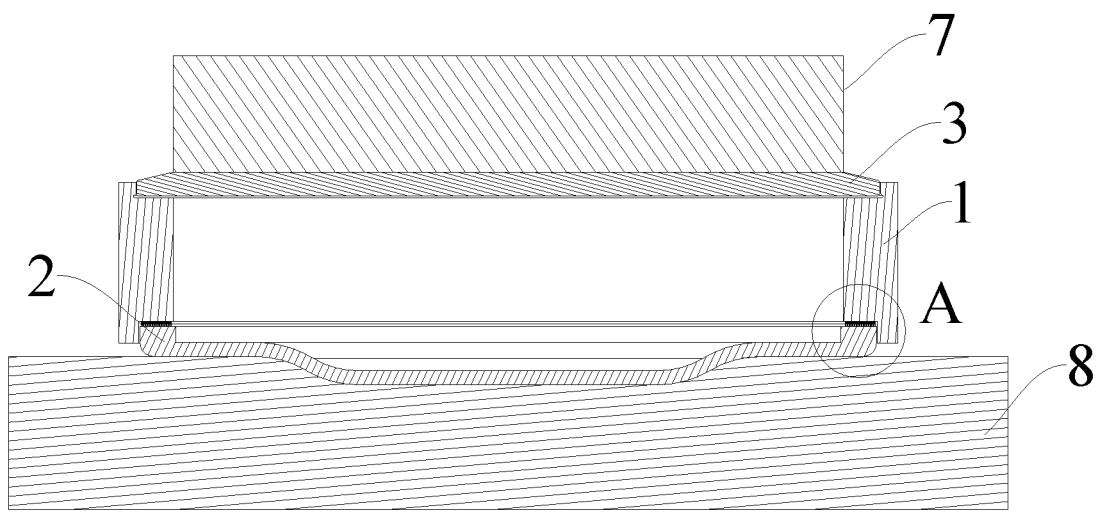
FIG. 8 is a schematic view of a pressing process of a first connecting member and a second connecting member according to an embodiment of the present disclosure.
Figure 9:
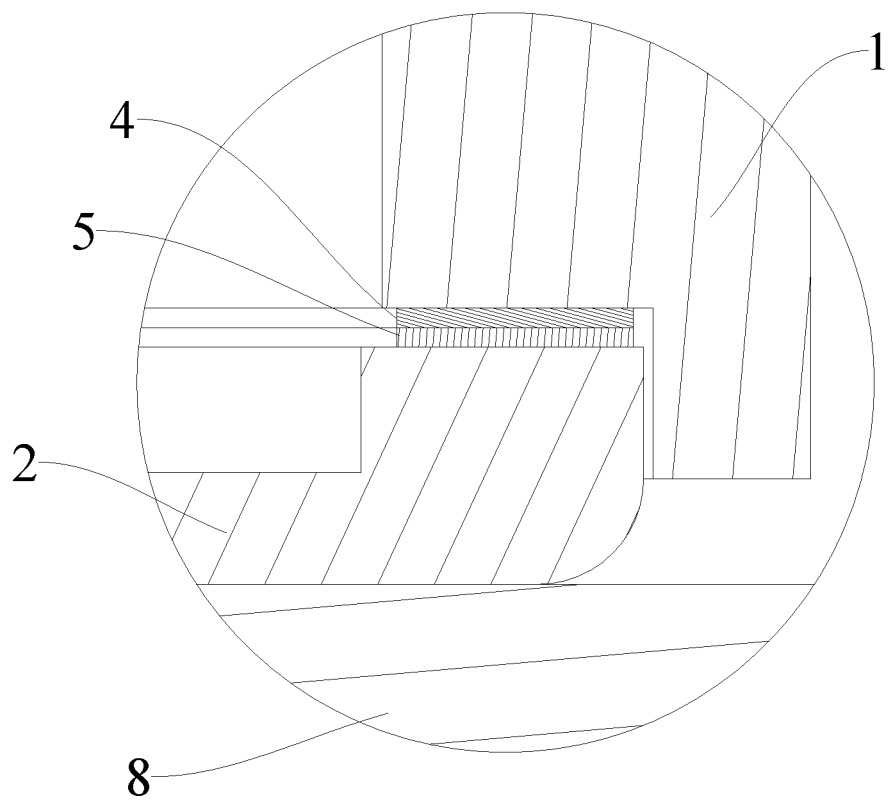
FIG. 9 is a partial enlarged view of portion A in FIG. 8.
Figure 10:
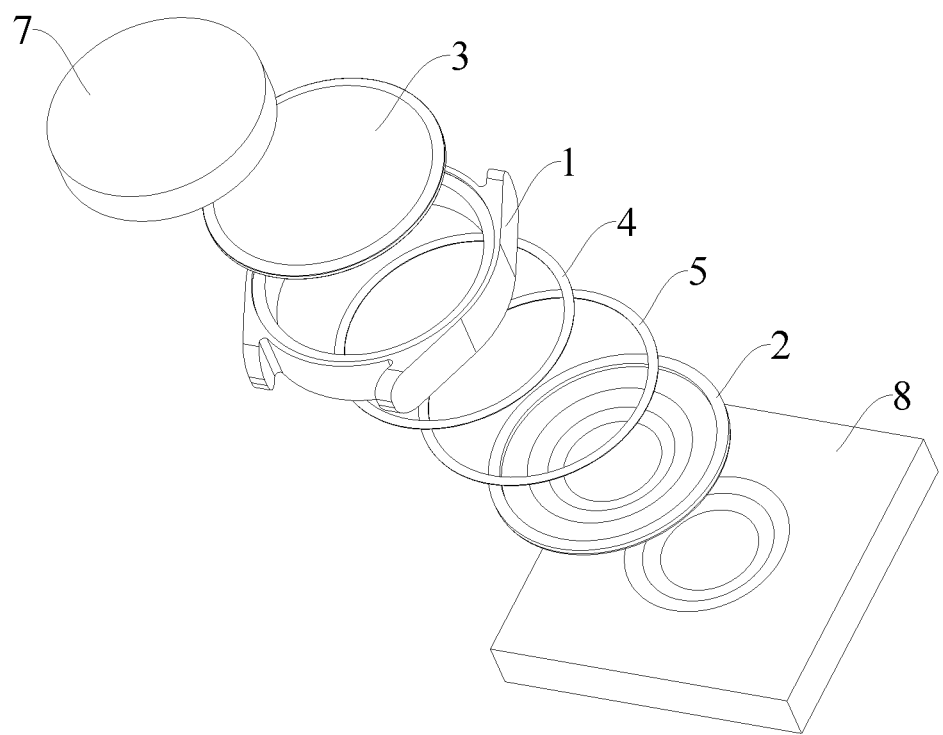
FIG. 10 is an exploded view of a device shown in FIG. 8.

Further, as shown in FIGS. 8 to 10, the first connecting member 1 and the second connecting member 2 are pressed against each other by following steps. A fixture 8 is provided, and the fixture 8 has a fixing groove matched with a shape of the second connecting member 2. The first connecting member 1 and the second connecting member 2 which are preliminarily fixed are placed on the fixture 8, and it is ensured that the second connecting member 2 is located in the fixing groove, so as to prevent the second connecting member 2 from moving. Finally, the first connecting member 1 is pressed by a cold pressing head 7, until the first laser adhesive layer 4 and the second laser adhesive layer 5 are completely bonded and infiltrated, and the assembly process of the first connecting member 1 and the second connecting member 2 is completed.

During the pressing process of the first connecting member 1 and the second connecting member 2, a pressure applied by the cold pressing head 7 to the first connecting member 1 is 255 N to 265 N, and a duration of the cold pressing head 7 applying the pressure to the first connecting member 1 is 25 s to 30 s, thus ensuring that the first laser adhesive layer 4 and the second laser adhesive layer 5 can be completely bonded and infiltrated.

During the pressing process of the first connecting member 1 and the second connecting member 2, the first laser adhesive layer 4 and the second laser adhesive layer 5 may also be activated, thus further improving the speed of complete bonding and infiltration of the first laser adhesive layer 4 and the second laser adhesive layer 5 and the bonding effect.

During the case closing process, i.e. the pressing process of the first laser adhesive layer 4 and the second laser adhesive layer 5, the laser activation or the hot pressing activation may also be used to activate the first laser adhesive layer 4 and the second laser adhesive layer 5. If the hot pressing activation is used, the cold pressing head 7 only needs to be replaced by the hot pressing head 6, and the first laser adhesive layer 4 and the second laser adhesive layer 5 can be heated and activated by the hot pressing head 6.

If the laser activation is used, it is necessary to ensure that the laser can pass through one of the first connecting member 1 and the second connecting member 2 and irradiate the other one of the first connecting member 1 and the second connecting member 2. Therefore, one of the first connecting member 1 and the second connecting member 2 is made of a transparent material. For example, the first connecting member 1 is made of the transparent material, the second connecting member 2 is made of an opaque material, and the laser is incident from the first connecting member 1 and irradiates the second connecting member 2. That is, the laser penetrates the first connecting member 1 from a side of the first connecting member 1 facing away from the second connecting member 2 to another side of the first connecting member 1 facing towards the second connecting member 2. The surface of the second connecting member 2 generates a high temperature instantly, and transfers heat to the first laser adhesive layer 4 and the second laser adhesive layer 5. The two laser adhesive layers are activated simultaneously, and complete the whole bonding and infiltration process quickly, so as to stably bond the first connecting member 1 and the second connecting member 2 together.

A wearable device according to embodiments of the present disclosure is processed by the assembly method described in any one of the above embodiments. The wearable device includes a smart watch, a smart bracelet, smart glasses, etc.

In some embodiments, the wearable device includes a middle frame and a back cover. The middle frame and the back cover are connected by a laser adhesive, and the laser adhesive between the middle frame and the back cover is formed by pressing two laser adhesive layers after activation of the two laser adhesive layers.

Therefore, the whole wearable device according to the embodiments of the present disclosure has good aesthetics and integration, can achieve a waterproof performance of 5 ATM and has a small thickness.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "peripheral" should be construed to refer to the orientation and position as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In addition, terms "first" and "second" are only used for purpose of description and cannot be understood as indicating or implying relative importance or implicitly indicating the number of indicated technical features. Thus, the features defined by "first" and "second" may include at least one of the features explicitly or implicitly. In the description of the present disclosure, "a plurality of" means at least two such as two or three, unless otherwise expressly and specifically defined.

In the present disclosure, unless otherwise expressly defined, terms such as "mounted," "connected," "coupled," and "fixed" shall be understood broadly, and may be, for example, fixed connections, detachable connections, or integral connections; may also be mechanical or electrical connections or intercommunication; may also be direct connections or indirect connections via intervening media; may also be inner communications or interactions of two elements. For those skilled in the art, the specific meaning of the above terms in the present disclosure can be understood according to the specific situations.

In the present disclosure, unless otherwise expressly defined and specified, a structure in which a first feature is "on" or "below" a second feature may include an embodiment in which the first feature is in direct contact with the second feature, or may further include an embodiment in which the first feature and the second feature are in indirect contact through intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature, while a first feature "below," "under," or "on bottom of" a second feature may include an embodiment in which the first feature is right or obliquely "below," "under," or "on bottom of" the second feature, or just means that the first feature is at a height lower than that of the second feature.

In the description of the present disclosure, terms such as "an embodiment," "some embodiments," "an example," "a specific example," or "some examples," mean that a particular feature, structure, material, or characteristic described in connection with the embodiment or example is included in at least one embodiment or example of the present disclosure. Thus, the illustrative expressions of these terms throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples as well as features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations made to the above embodiments by those skilled in the art all fall within the scope of the present disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A watch assembly method, comprising:
   processing a first bonding surface on a first connecting member, bonding a first laser adhesive layer on the first bonding surface and activating the first laser adhesive layer;
   processing a second bonding surface on a second connecting member, bonding a second laser adhesive layer on the second bonding surface and activating the second laser adhesive layer;
   fixing the second connecting member with the first connecting member preliminarily in such a manner that the first laser adhesive layer and the second laser adhesive layer face each other, and pressing the first connecting member and the second connecting member against each other until the first laser adhesive layer and the second laser adhesive layer are completely bonded and infiltrated, wherein each of the first bonding surface and the second bonding surface is processed by a laser engraving process, a surface energy of the first bonding surface is greater than 34 A, a surface energy of the second bonding surface is greater than 36 A, and each of a roughness of the first bonding surface and a roughness of the second bonding surface is greater than 0.6 μm.

2. The watch assembly method according to claim 1, wherein the first connecting member is a middle frame, the middle frame comprises a front end having a first annular mounting groove and a rear end having a second annular mounting groove, a screen cover is mounted in the first annular mounting groove, and the second annular mounting groove comprises a bottom configured as the first bonding surface;
   the second connecting member is a cover, the cover has an annular protrusion, and the annular protrusion has an end face configured as the second bonding surface.

3. The watch assembly method according to claim 1, wherein each of a thickness of the first laser adhesive layer and a thickness of the second laser adhesive layer is 0.1 mm to 0.2 mm.

4. The watch assembly method according to claim 1, wherein the first laser adhesive layer and the second laser adhesive layer are activated by at least one of a laser activation and a hot pressing activation,
   when the laser activation is used, the first laser adhesive layer and the second laser adhesive layer are directly irradiated by a laser,
   when the hot pressing activation is used, the first laser adhesive layer is pressed on the first connecting member and heated by a hot pressing head, and the second laser adhesive layer is pressed on the second connecting member and heated by the hot pressing head.

5. The watch assembly method according to claim 4, wherein when the hot pressing activation is used, each of a pressure applied by the hot pressing head to the first laser adhesive layer and a pressure applied by the hot pressing head to the second laser adhesive layer is 135 N to 145 N;
   each of a duration of the hot pressing head applying the pressure to the first laser adhesive layer and a duration of the hot pressing head applying the pressure to the second laser adhesive layer is 20 s to 25 s;
   a heating temperature of the hot pressing head is 80° C. to 85° C.

6. The watch assembly method according to claim 4, wherein when the first laser adhesive layer is activated by the hot pressing activation, a first high-temperature resistant release film is arranged between the hot pressing head and the first laser adhesive layer;
   when the second laser adhesive layer is activated by the hot pressing activation, a second high-temperature resistant release film is arranged between the hot pressing head and the second laser adhesive layer.

7. The watch assembly method according to claim 1, wherein pressing the first connecting member and the second connecting member against each other comprises: providing a fixture, placing the first connecting member and the second connecting member which are preliminarily fixed on the fixture, and pressing the first connecting member and the second connecting member against each other by a cold pressing head.

8. The watch assembly method according to claim 7, wherein a pressure applied by the cold pressing head is 255 N to 265 N, and a duration of the cold pressing head applying the pressure is 25 s to 30 s.

9. The watch assembly method according to claim 7, wherein, in a pressing process of the first connecting member and the second connecting member, the first laser adhesive layer and the second laser adhesive layer are heated and activated through replacing the cold pressing head with a hot pressing head.

10. The watch assembly method according to claim 7, wherein, in a pressing process of the first connecting member and the second connecting member, the first laser adhesive layer and the second laser adhesive layer are activated by a laser.

11. The watch assembly method according to claim 10, wherein one of the first connecting member and the second connecting member is made of a transparent material, and the laser passes through the one of the first connecting member and the second connecting member to activate the first laser adhesive layer and the second laser adhesive layer.

* * * * *